(12) United States Patent
Miles et al.

(10) Patent No.: US 9,719,815 B2
(45) Date of Patent: *Aug. 1, 2017

(54) INTERCHANGEABLE DISPLAY ASSEMBLY

(71) Applicant: Access Business Group International LLC, Ada, MI (US)

(72) Inventors: Michael E. Miles, Grand Rapids, MI (US); Terry L. Lautzenheiser, Nunica, MI (US); Karlis Vecziedins, Caledonia, MI (US)

(73) Assignee: Access Business Group International LLC, Ada, MI (US)

( * ) Notice: Subject to any disclaimer, the term of this patent is extended or adjusted under 35 U.S.C. 154(b) by 143 days.

This patent is subject to a terminal disclaimer.

(21) Appl. No.: 14/575,222

(22) Filed: Dec. 18, 2014

(65) Prior Publication Data
US 2015/0138748 A1 May 21, 2015

Related U.S. Application Data

(63) Continuation of application No. 13/213,256, filed on Aug. 19, 2011, now Pat. No. 8,944,620.

(51) Int. Cl.
*G01D 11/28* (2006.01)
*G09F 23/00* (2006.01)
(Continued)

(52) U.S. Cl.
CPC ......... *G01D 11/28* (2013.01); *G09F 23/0058* (2013.01); *F21V 11/00* (2013.01); *F21V 11/02* (2013.01); *F21V 11/06* (2013.01); *F21V 33/0044* (2013.01); *F21W 2131/305* (2013.01); *F21W 2131/307* (2013.01); *G09F 3/202* (2013.01); *G09F 7/02* (2013.01); *G09F 13/04* (2013.01); *G09F 2007/005* (2013.01); *G09F 2013/0454* (2013.01); *Y10T 29/49002* (2015.01)

(58) Field of Classification Search
CPC .......... F21V 11/00; F21V 11/02; F21V 11/06; F21V 23/005; F21V 33/0044; G01D 11/28; G09F 23/0058; G09F 2013/0454; G09F 7/02; G09F 3/202; G09F 13/04; G09F 2007/005; F21W 2131/305; F21W 2131/307; H04M 1/22
See application file for complete search history.

(56) References Cited

U.S. PATENT DOCUMENTS 4,682,432 A 7/1987 Taylor et al.
4,768,300 A 9/1988 Rutili
(Continued)

*Primary Examiner* — Y M Lee
(74) *Attorney, Agent, or Firm* — Warner Norcross & Judd LLP

(57) ABSTRACT

A lighted display assembly for an appliance includes interchangeable display screens. Multiple light sources flash, turn on and turn off to indicate a status of the appliance by illuminating a selected one of the display screens. A display grid extends continuously between the light sources and the selected display screen and defines light passages that are each uniquely associated with one or more corresponding light sources. Light emitted by each light source is confined to a discrete area of the display screen by the corresponding light passage. The discrete areas of the interchangeable display screens may include any of a variety of markings, for example, markings in a different language. The assemblies may be tailored to the needs of a particular customer by selecting an appropriate display screen.

17 Claims, 8 Drawing Sheets

(51) Int. Cl.

| | | |
|---|---|---|
| G09F 7/02 | (2006.01) | |
| F21V 11/06 | (2006.01) | |
| G09F 3/20 | (2006.01) | |
| F21W 131/305 | (2006.01) | |
| F21V 33/00 | (2006.01) | |
| F21V 11/02 | (2006.01) | |
| G09F 13/04 | (2006.01) | |
| F21V 11/00 | (2015.01) | |
| G09F 7/00 | (2006.01) | |
| F21W 131/307 | (2006.01) | |

(56) References Cited

U.S. PATENT DOCUMENTS

| | | |
|---|---|---|
| 5,007,190 A | 4/1991 | Shyu |
| 5,321,417 A | 6/1994 | Voelzke et al. |
| 5,638,052 A | 6/1997 | Furuya et al. |
| 6,190,026 B1 | 2/2001 | Moore |
| 6,966,136 B2 | 11/2005 | Connors |
| 7,114,623 B2 | 10/2006 | Robinson |
| 7,325,346 B2 | 2/2008 | Chirnomas et al. |
| 7,594,852 B2 | 9/2009 | Rasmussen |
| 2002/0059742 A1 | 5/2002 | Okazaki et al. |
| 2005/0166945 A1 | 8/2005 | Whitmore |
| 2006/0000848 A1 | 1/2006 | Humphrey |
| 2007/0188024 A1* | 8/2007 | Shitanaka ............... G09F 13/04 307/10.1 |
| 2008/0164279 A1 | 7/2008 | Chirnomas et al. |
| 2009/0072883 A1 | 3/2009 | Ehrlich et al. |
| 2010/0116842 A1 | 5/2010 | Hecht et al. |
| 2010/0321919 A1 | 12/2010 | Yang |

* cited by examiner

INTERCHANGEABLE DISPLAY ASSEMBLY

BACKGROUND OF THE INVENTION

This invention relates to display assemblies. More particularly, this invention relates to lighted display assemblies for use in electronics or appliances.

Lighted displays are commonly included in many appliances to communicate various information about the appliance to a user. For example, the display may indicate whether the appliance is turned on, whether the appliance is functioning properly, or what stage or cycle the appliance is in. Often these displays are a fixed, permanent part of the appliance.

As more businesses distribute products internationally to take advantage of a larger consumer base, it may become desirable to create a lighted display that is tailored for use in specific countries. For example, a washing machine sold in China may include information in the Chinese language and use common Chinese symbols and icons, while the same washing machine sold in France would likely include information in the French language and use common French symbols and icons.

It also becomes desirable to customize displays for products distributed in a single geographic region. For example, a manufacturer may produce a line of appliances that includes a base model, and various higher end models that each include additional options that a customer may choose in order to best serve their needs. The display for each version of appliance within the line of appliances may be tailored to reflect the options selected and may be capable of providing status information to the user corresponding to those options.

Manufacturing each variation of electronics device and appliance with a different, custom display may become expensive because of a significant increase in the number of parts, the variation in parts and the required manufacturing time. Because the displays are typically a fixed, permanent part of the appliance, each display may require a different installation technique, which may further increase manufacturing time. In some products, the entire display assembly may need to be customized and configured differently in order to display the appropriate information corresponding to the particular product application.

SUMMARY OF THE INVENTION

The present invention provides an interchangeable lighted display assembly that provides variation in the presentation of information displayed by using interchangeable display screens.

In one embodiment, the lighted display assembly includes at least two light sources for indicating a status of an appliance and first and second interchangeable display screens that have markings different from each other. One of the display screens may be selected for use with the lighted display assembly. A display grid extends between the light sources and the selected display screen and defines at least two light passages. Each light passage is uniquely associated with a corresponding light source and extends between the corresponding light source and the selected display screen. The lighted display assembly may include a circuit board connected to the light sources. The display screens may have substantially the same size and shape and may include markings in different languages.

In another embodiment, the lighted display assembly includes a light gasket positioned between the circuit board and the display grid. The light gasket may seat against the circuit board and include apertures aligning with the light sources. The display grid may seat against the light gasket.

In another embodiment, the lighted display assembly includes a display screen frame positioned between the selected display screen and the display grid. The display screen frame may be sized to fit over and engage the display grid. The selected display screen may be attachable to the display screen frame.

In another embodiment, a method for assembling a lighted display assembly is provided, including positioning a display grid relative to at least two light sources so that the light passages defined in the display grid are each uniquely associated with at least one light source. One display screen is selected from a group of two display screens having different markings, but a substantially similar size and shape. The selected display screen is secured relative to the display grid so that the light sources illuminate the selected display screen.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and may be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

I. Overview

Figures 1, 2:
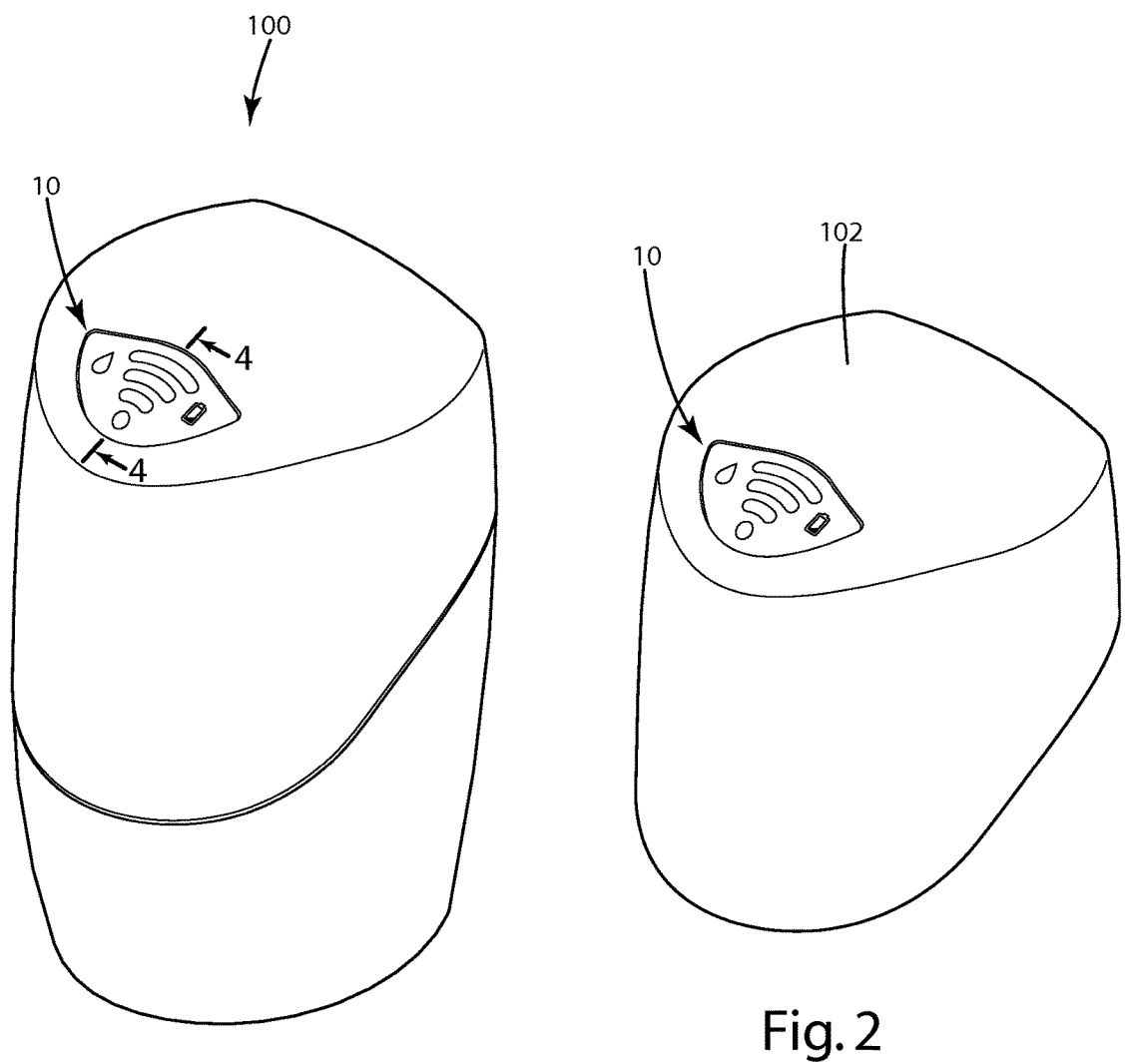
FIG. 1 is a front perspective view of one embodiment of the present invention.
FIG. 2 is a front perspective view of the embodiment of FIG. 1.
Figure 3:
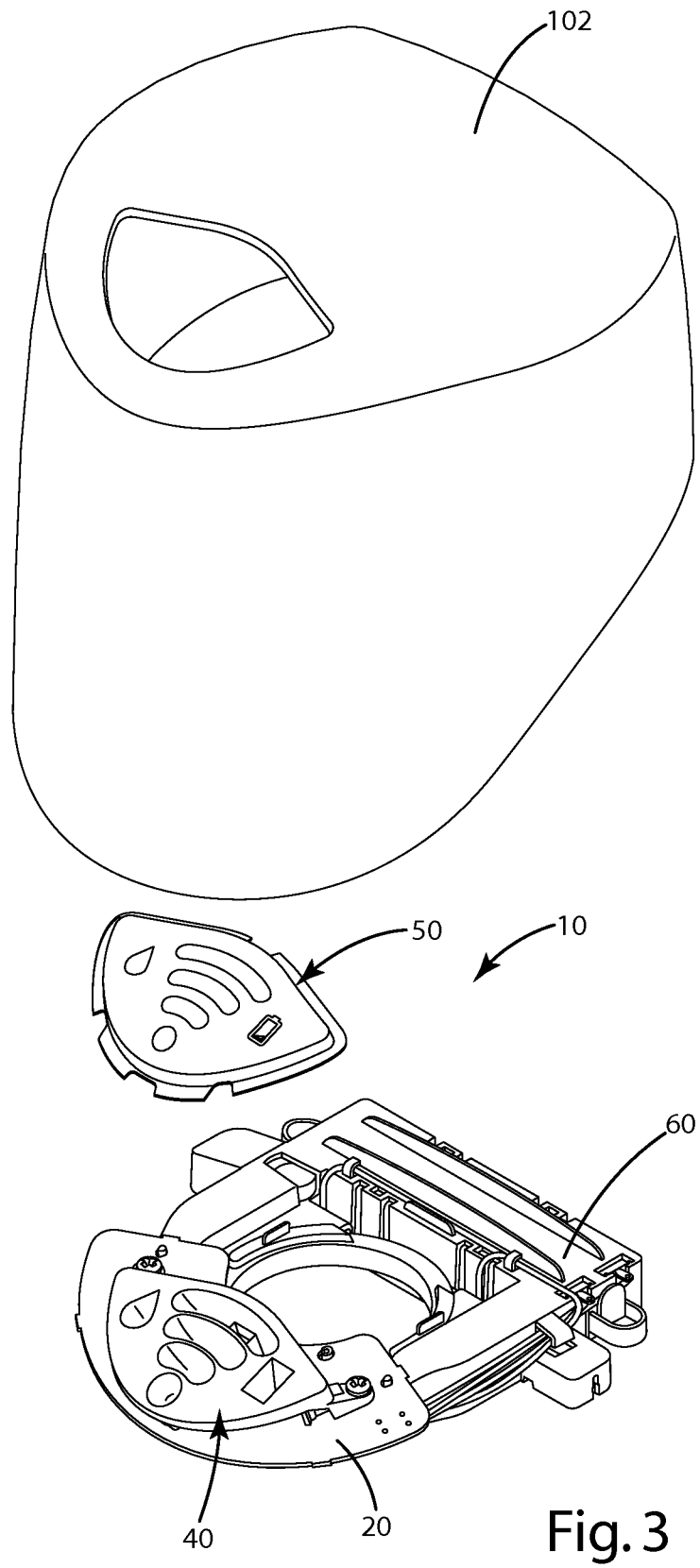
FIG. 3 is an exploded front perspective view of the embodiment of FIG. 1.

An interchangeable display assembly according to the current embodiments of the present invention is shown in the figures. The display assembly is shown as part of a home appliance or electronics 100, and may indicate at least one status or state of operation of the appliance. As used in this application, "appliance" is intended to encompass any home appliance, electronics, or similar device. For example, the home appliance may be a water treatment system and the display assembly may indicate that the water treatment system is currently treating water. It will be understood that the display assembly may be installed in any of a variety of electronics and appliances, including home air treatment systems and may indicate any of a variety of statuses with regard to the appliance.

II. First Embodiment

A first embodiment of the interchangeable display assembly is shown in FIGS. 1-6 and generally designated 10. As shown, the display assembly 10 is positioned within the top shroud 102 of the appliance 100 and generally includes a controller or circuit board 20, multiple light sources 30, a display grid 40 and a display screen 50.

The circuit board 20 may be connected to an electronics assembly 60 and may determine a status or state of operation of the appliance 100. The circuit board 20 may be connected to the light sources 30 and may cause one or more of the light sources 30 to flash, turn on or turn off to communicate the state of operation of the appliance 100 to the user. For example, if the appliance 100 is a home water treatment system, one light source 30 may illuminate to indicate that the system is currently treating water and another light source 30 may illuminate to indicate that the system is in a standby mode and is not currently treating water. The light sources 30 may be any of a variety of suitable light sources, including Light Emitting Diodes (LEDs). For example, in certain embodiments, a light source can be an LED that can change color and/or use color mixing to produce light of a desirable color, such as a Red Green Blue LED, for example. The light sources 30 may be mounted directly to the circuit board 20 or may be electrically connected to the circuit board 20 and mounted to another structure in the appliance 100.

Figure 4:
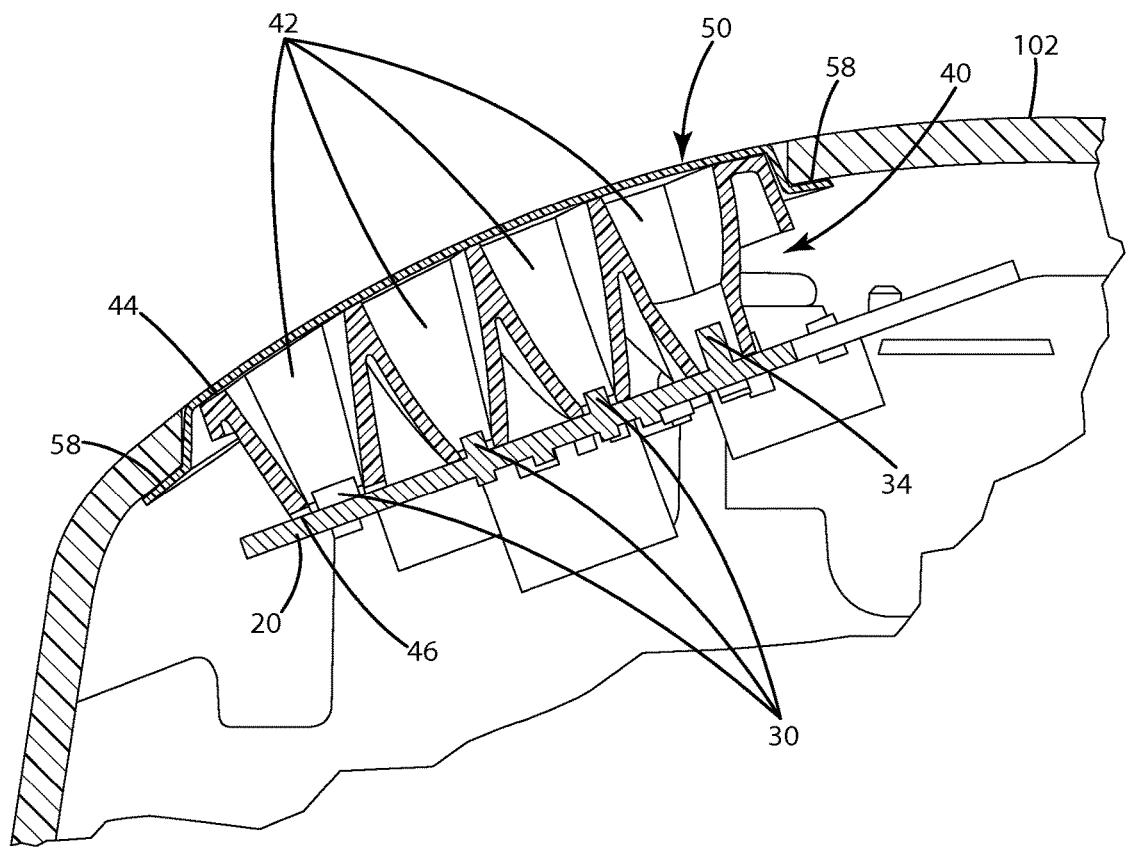
FIG. 4 is a sectional view along the line 4-4 in FIG. 1.
Figure 5:
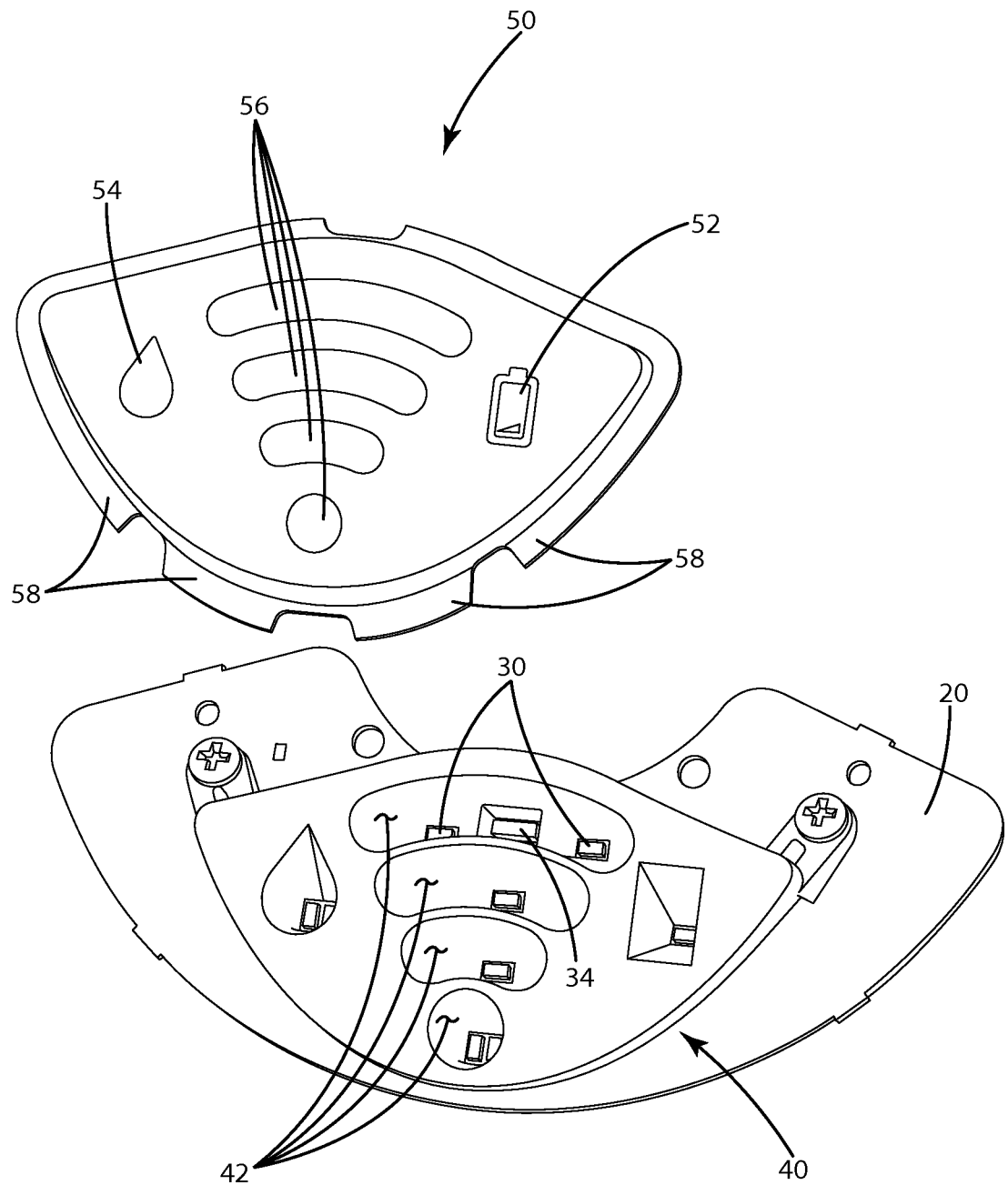
FIG. 5 is an exploded top perspective view of the embodiment of FIG. 1.
Figure 6:
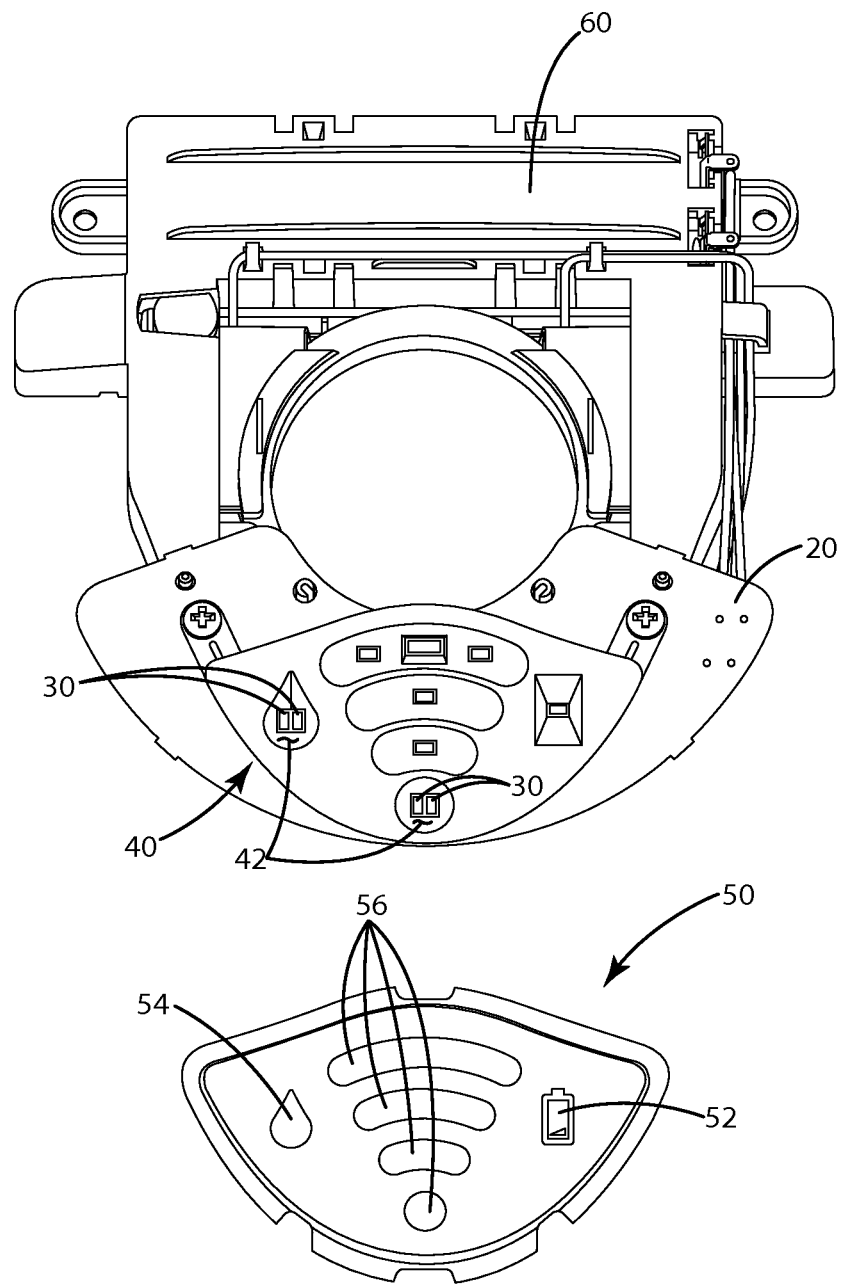
FIG. 6 is a top view of the embodiment of FIG. 1 with the shroud removed.

The display grid 40 is generally a structural unit that extends between the light sources 30 and the display screen 50. The display grid 40 includes an upper surface 44 and a lower surface 46 spaced from the upper surface. In one embodiment, the upper surface 44 is spaced from the lower surface 46 at a desired distance such that the display grid 40 forms a spacer between the light sources 30 and the display screen 50. The display grid 40 may define one or more light passages 42, with one end of each light passage 42 positioned proximate a light source 30 and the other end of each light passage 42 positioned proximate the display screen 50. Each light passage 42 may be uniquely associated with each light source 30. As shown in FIGS. 5 and 6, a light passage 42 may be uniquely associated with more than one light source 30, for example, two light sources (see uppermost light passage 42 in FIG. 5 and light passages 42 in FIG. 6). In this configuration, the light sources 30 may be the same color, or different colors to provide more display options. A light passage 42 may also be associated with an object other than a light source 30. For example, as shown in FIGS. 4 and 5, the uppermost light passage 42 is associated with an Infrared (IR) sensor 34 that allows for communication between the appliance 100 and an external device, such as a service diagnostic device. In this example, the IR sensor 34 is hidden below the display screen 50, which makes the IR sensor 34 accessible through the display screen 50 while being unknown to the end user.

In the illustrated embodiment, each light passage 42 defines a discrete channel within the display screen 50 to separate and control which region of the display screen 50 is illuminated by each light source 30. As shown in FIG. 4, a cross section of each light passage 42 may vary along the distance between the light sources 30 and the display screen 50. For example, a cross section of a light passage 42 may be relatively smaller proximate a light source 30 and relatively larger proximate the display screen 50. The size and shape of each light passage 42 may also vary. For example, some of the light passages 42 shown in FIG. 5 consecutively increase in size, while another of the light passages 42 is shaped like a water droplet. This configuration may allow each light source 30 to illuminate a different sized and/or shaped portion of the display screen 50 based upon the variation of the display grid 40 defining the size and shape of the light passages 42.

The display grid 40 and light passages 42 may extend completely or partially between the light sources 30 and the display screen 50. As shown in FIG. 4, the display grid 40 may engage the circuit board 20 or other structure supporting the light source 30 so that each light source 30 is positioned within a respective light passage 42, which may ensure that substantially all of the light emitted by the light source 30 is contained by the light passage 42. The display grid 40 may engage the display screen 50 so that each discrete region of the display screen 50 is precisely defined, and substantially no light escapes between the display grid 40 and the display screen 50. In other words, substantially all of the light contained by each light passage 42 is directed outward, through the display screen 50. In this configuration, the display grid 40 generally extends between the circuit board 20 and the display screen 50, surrounding light sources 30. The display grid 40 may also provide structural support for the display screen 50.

The surfaces of each light passage 42 may include reflective materials to reflect light if the amount of light directed toward the display screen 50 is to be maximized. The surfaces of each light passage 42 may absorb light if the light passages 42 are to act more as containment for the emitted light and maximizing the emitted light is not a concern. In the illustrated embodiment, screws are used to secure the display grid 40, but any suitable securing method may be used, including heat staking.

The display screen 50 is positioned adjacent the display grid 40 so that the display screen 50 is in light communication with the light sources 30 through the light passages 42. The display screen 50 may be transparent or translucent and may include markings corresponding to the status or state of operation of the appliance 100. In another embodiment, the display screen 50 may be opaque and the markings may be transparent or translucent. Each marking may be positioned to align with a corresponding region defined by the light passages 42. In this configuration, light emitted from each light source 30 travels through a corresponding light passage 42 and illuminates a corresponding portion of the display screen 50. In use, a user viewing the display screen 50 will see an illuminated region, with the markings corresponding to the status or state of operation of the appliance 100 accented by the illumination. For example, the marking may be a low battery graphic 52 (shown in FIGS. 5 and 6) or the words "LOW BATTERY," to indicate when the battery for the appliance 100 is reaching the end of its life. The marking may be positioned over the light passage 42 corresponding to the light source 30 that illuminates or flashes when the status corresponding to that marking is detected by the circuit board 20. For example, when the battery for the appliance 100 is getting low, the circuit board 20 will illuminate the corresponding light source 30, which emits light through a corresponding light passage 42, and illuminates the region of the display screen 50 corresponding to the battery graphic 52 or the "LOW BATTERY" marking. Similar markings may be included in the display screen 50 and aligned with different light passages 42 to indicate any of a variety of statuses of the appliance 100. If a light passage 42 is uniquely associated with more than one light source 30, each light source 30 may illuminate separately at different times to illuminate the display screen 50, or a combination of more than one light source 30 may illuminate at the same time to illuminate the display screen 50, depending on the conditions determined by the circuit board 20. Illuminating more than one light source 30 simultaneously in combination may produce a different color than is produced by the individual light sources 30, which may provide increased flexibility in the display assembly 10.

The marking may also be in a particular shape. For example, in the shape of a drop of water 54, to indicate that water is flowing through the appliance 100. The display screen 50 may also include a series of markings 56 to indicate a status. For example, the series of markings 56 shown in FIGS. 5 and 6 may correspond to a filter life span in the appliance 100, with each successive marking 56 indicating a varying level of filter life. In this configuration, the display screen 50 may be opaque, with the series of markings 56 transparent or translucent.

As shown in FIG. 4, the display screen 50 may have retaining tabs 58 that engage an inner surface of the shroud 102 to retain the display screen 50. The display screen 50 with retaining tabs 58 is captured between the display grid 40 and the shroud 102, holding the display screen 50 securely in place. Other suitable attachment methods are also considered to secure display screen 50.

Multiple interchangeable display screens 50 with substantially the same size and shape may be manufactured to correspond to a single display grid 40, group of light sources 30 and circuit board 20. The multiple display screens 50 may provide the status of the appliance 100 in a variety of different ways, including in a different language, with different graphics, in a different orientation or using different market-specific information. For example, if the "LOW BATTERY" marking is used as described above, one or more display screens 50 with the words "LOW BATTERY" translated into other languages may be manufactured for use in countries speaking those languages. The marking may be positioned over the same light passage 42 as the English marking so that the same circuit board 20, light sources 30 and display grid 40 may be used. Similarly, a graphic or icon may also be changed to one more familiar to a culture, region or consumer group. For example, if the appliance 100 is intended for children, a cartoon graphic indicating a low battery may be substituted for the more conventional battery graphic 52 described above. In this manner, the display assembly 10 and the appliance 100 may be tailored to any of a variety of consumers by simply substituting a different display screen 50. This provides a versatile manufacturing process while adding a minimal number of additional parts.

Interchangeable display screens 50 may also be used to provide different indications with regard to different appliances. For example, one display screen 50 may be designed for use in a water treatment system while another display screen 50 with a similar size and shape may be designed for use in an air treatment system. In this configuration, both systems may use the same light sources 30 and display grid 40, but the circuit board 20 may be programmed differently to illuminate the appropriate light sources 30 for the different appliances. The markings on each of the display screens 50 may be in a similar location (because the light passages 42 are in the same location), but may indicate completely different statuses. For example, in the embodiment illustrated in FIGS. 5 and 6, the markings 56 may indicate a consecutively decreasing water filter life in a water treatment system and a consecutively increasing motor speed in an air treatment system. Some of the markings may remain the same for each appliance. For example a low battery marking may be used for both a water treatment system and an air treatment system.

The display grid 40 and display screen 50 may be made of any suitable material including metal, plastic and composite. These elements may be manufactured using any suitable manufacturing process, including injection molding, compression molding thermoforming and extrusion. The markings may be formed in or on display screen 50 using any of a variety of materials and processes.

III. Second Embodiment

Figure 7:
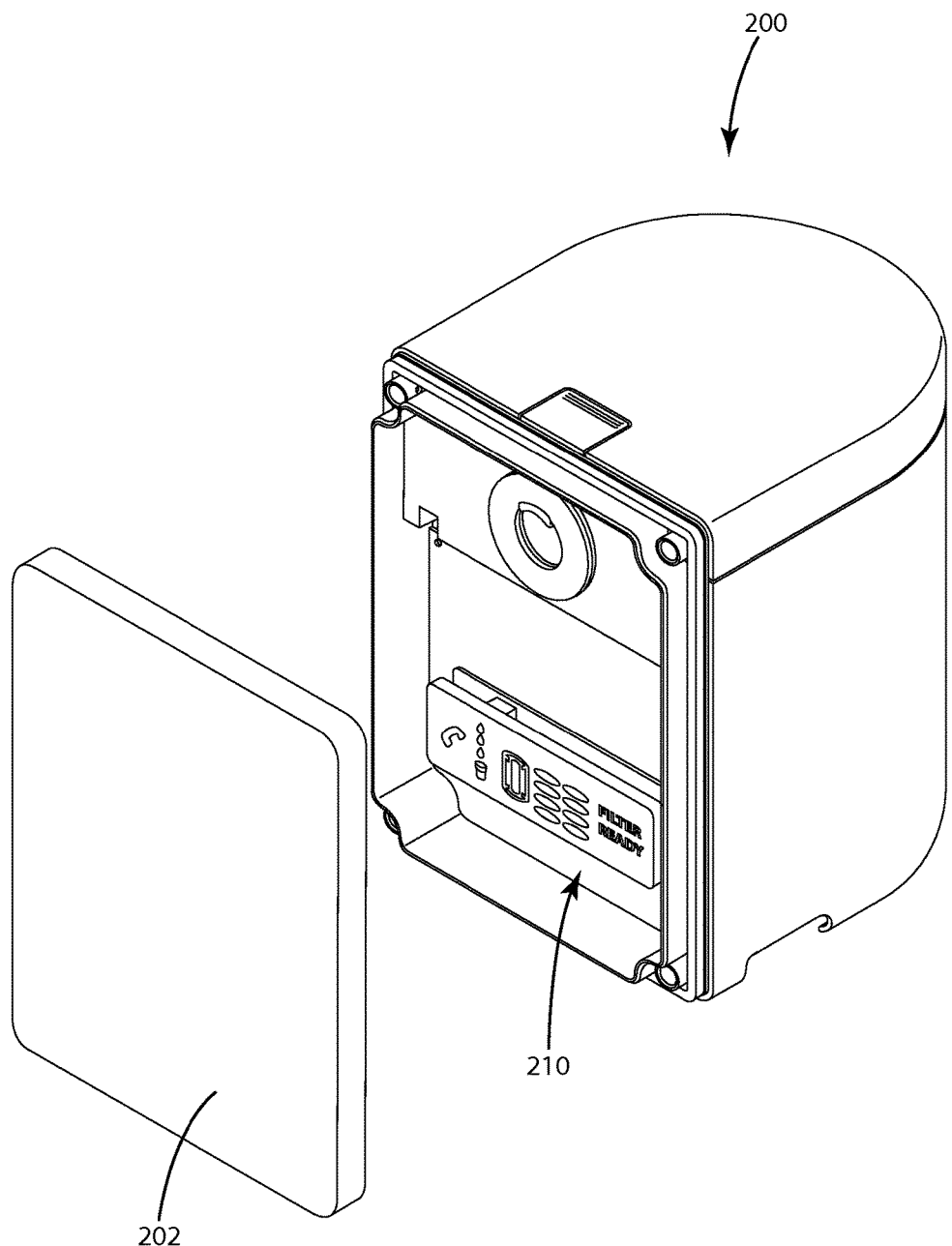
FIG. 7 is a perspective view of a second embodiment of the present invention.
Figure 8:
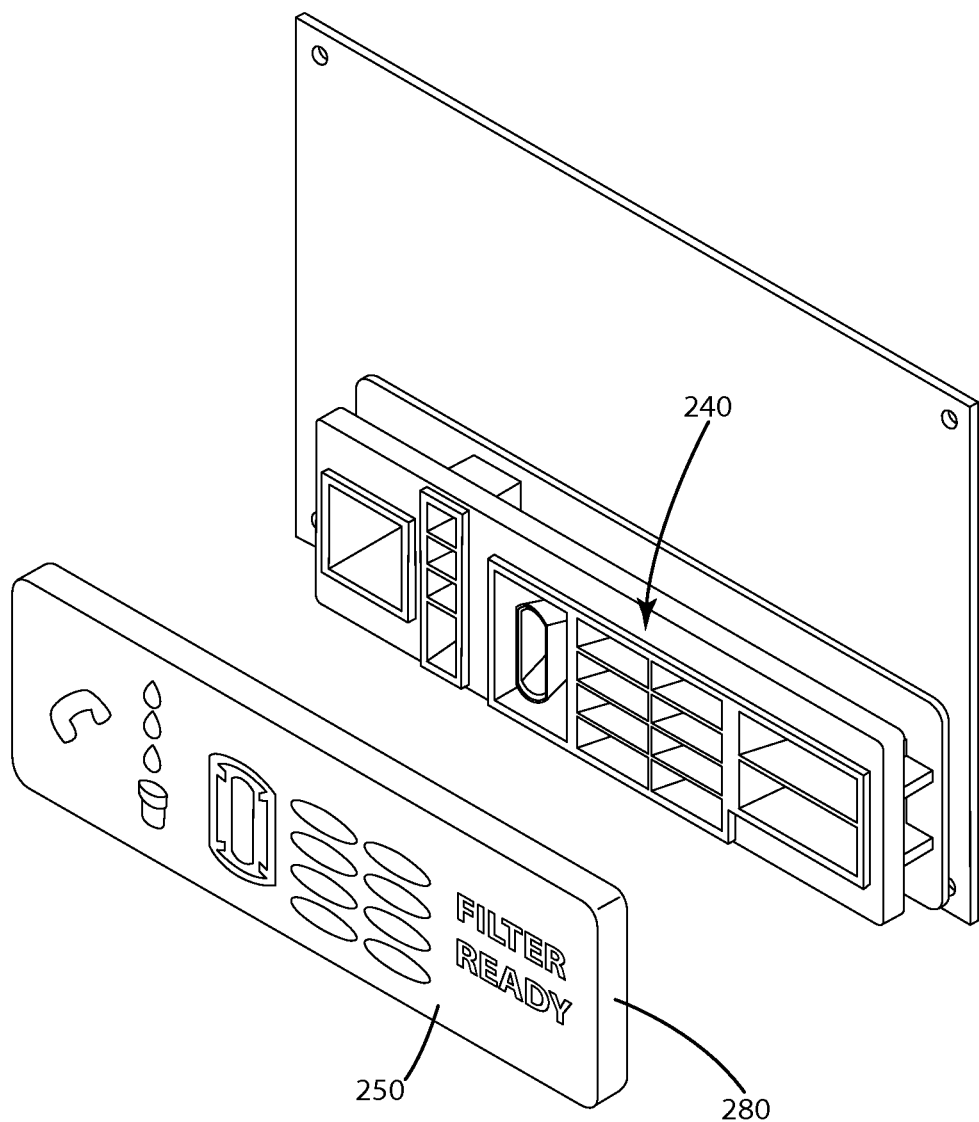
FIG. 8 is a partially exploded perspective view of the embodiment of FIG. 7.
Figure 9:
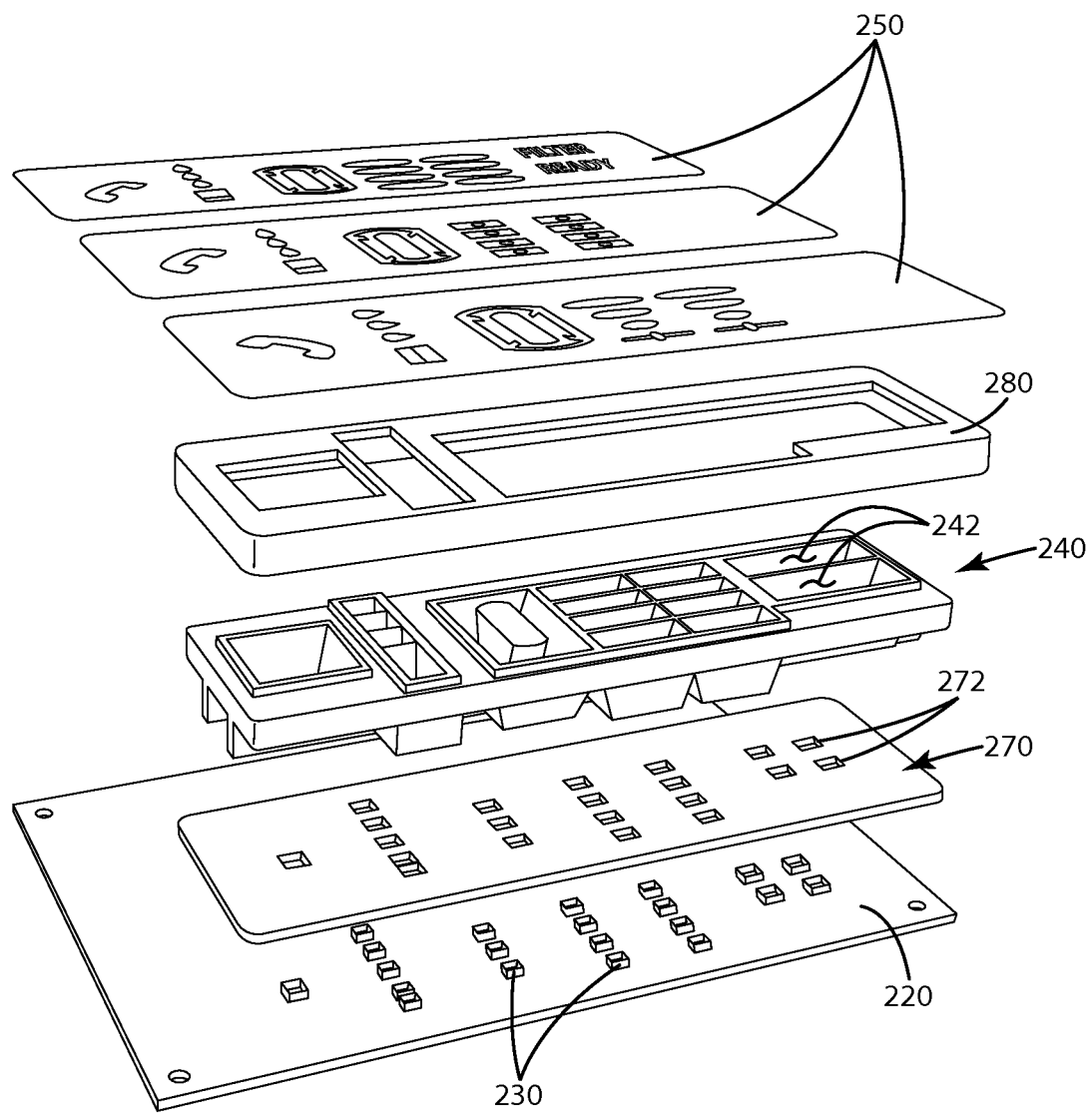
FIG. 9 is an exploded perspective view of the embodiment of FIG. 7.

An interchangeable display assembly according to a second embodiment of the present invention is shown in FIGS. 7-9 and generally designated 210. The display assembly 210 is shown as part of a home appliance 200, and may indicate at least one status or state of operation of the appliance 200. For example, the home appliance may be an air treatment system and the display assembly 210 may indicate that the air treatment system is currently treating air. As with the first embodiment, it will be understood that the display assembly 210 may be installed in any of a variety of electronics and appliances, and may indicate any of a variety of statuses with regard to the appliance.

As shown in FIGS. 7-9, the display assembly 210 may be positioned behind a cover 202 of the appliance 200 and generally includes a controller or circuit board 220, multiple light sources 230, a display grid 240 and a display screen 250. The cover 202 may be transparent to allow a user to view the display assembly 210 with the cover 202 closed, or the cover 202 may be translucent so the display screen 250 is only visible through the cover 202 when the light sources 230 are on. The circuit board 220, light sources 230, display grid 240 and display screen 250 function substantially as described above in connection with the first embodiment and will not be described here.

As shown in FIG. 9, the second embodiment may additionally include a light gasket 270 positioned between the circuit board 220 and the display grid 240. The light gasket 270 may include apertures 272 that align with the light sources 230. In this configuration, the light gasket 270 may seat against the circuit board 220 or other structure supporting the light sources 230 while allowing light emitted by the light sources 230 to pass through the gasket to the display grid 240. The light gasket 270 keeps the light from one light source 230 from leaking into or dispersing into a light passage 242 corresponding to another light source 230. The light gasket 270 may provide an interface surface to rigidly or resiliently support the display grid 240. The light gasket 270 may also cover certain light sources 230 depending on the application and the features of the appliance 200. For example, if a model of appliance 200 does not include a certain feature that would normally use a particular light source 230, a light gasket 270 may be used that covers the unused light source 230. The light gasket 270 may be thinner than the light sources 230 are tall, such that the light sources 230 extend beyond the light gasket 270 and are positioned within the light passages 242 in the display grid 240. The light gasket 270 may also be as thick as or thicker than the light sources 230 are tall, such that the light sources 230 are positioned adjacent the end of the light passages 242.

The second embodiment may also include a display screen frame 280, as shown in FIG. 9. The display screen frame 280 may be fitted over and secured directly to the display grid 240 such that the display screen frame 280 engages the display grid 240. The display screen frame 280 may also be secured to another structure so that the display screen frame 280 is secured relative to the display grid 240. The display screen frame 280 may be secured with any of a variety of methods, including friction fitting, adhesives and fasteners. The display screen frame 280 may provide an outer interface surface to which the interchangeable display screens 250 may be secured. The selected display screen 250 may similarly be secured or attached to the display screen frame 280 using any suitable method. The display screen frame 280 may be eliminated if the display grid 240 has suitable features to secure and hold the display screen 250.

The light gasket 270 and the display screen frame 280 of the second embodiment may also be used in combination with the first embodiment. The light gasket 270 may be made of any suitable material, including metal, plastic, composite and rubber. The display screen frame 280 may also be made of any suitable material, including metal, plastic and composite. The light gasket 270 and display screen frame 280 may be manufactured using any suitable process.

IV. Assembly

The interchangeable display assembly 10 of the present invention may be assembled by connecting the circuit board 20 to the light sources 30. If a light gasket 270 is used, the light gasket 270 may be seated against the circuit board 20, with light sources 30 inserted through apertures 272 in the light gasket 270 as described above. The display grid 40 may then be positioned against the light gasket 270 and relative to the light sources 30 so that each of the light passages 42 defined in the display grid 40 is uniquely associated with a light source 30. Depending on the thickness of the light gasket 270, the display grid 40 may be positioned so that a light source 30 is positioned proximate each light passage 42, or so that a light source 30 is positioned within each light passage 42. As described above, a light passage 42 may be uniquely associated with more than one light source 30. If a light gasket 270 is not used, the display grid may be positioned relative to the light sources 30 and may directly engage the circuit board 20.

If a display screen frame 280 is used, the display screen frame 280 may be fitted over and attached to the display grid 40 using any suitable attachment method. A display screen 50 may be selected from a group of display screens 50. As described above, the group of display screens 50 may have a substantially similar size and shape, and may each have different markings. The selected display screen 50 may be secured or attached to the display screen frame 280 relative to the display grid 40 so that the light sources 30 illuminate regions of the selected display screen 50. If a display screen frame 280 is not used, the selected display screen 50 may be secured directly or relative to the display grid 40.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A display assembly for an appliance comprising:
 a circuit board coupled to an electronic assembly;
 at least two communication devices on the circuit board configured to indicate a status of the appliance;
 an interchangeable display screen having at least one display, the interchangeable display screen engaging a shroud of the appliance; and
 a one-piece display grid extending between the communication devices and the interchangeable display screen;
 one or more light passages in the display grid, each light passage associated with one or more of said communication devices; and
 at least one display marking aligned with at least one of said light passages
 wherein said communication devices are visible through said interchangeable display screen and an opening in said shroud.

2. The display assembly of claim 1 wherein said display grid includes an upper surface and a lower surface and each of said light passages define a discrete channel extending completely through said display grid from said upper surface to said lower surface, each of said light passages extending between said communication device and said interchangeable display screen.

3. The display assembly of claim 1 wherein said communication device is a light configured to indicate said status of the appliance.

4. The display assembly of claim 1 wherein said communication device is an infrared sensor configured to communicate with an external device.

5. The display assembly of claim 1 wherein said plurality of light passages are each uniquely sized or shaped.

6. The display assembly of claim 1 wherein said interchangeable display screen includes retaining tabs to engage said shroud of the appliance.

7. The display assembly of claim 1 wherein a cover of the appliance houses the display assembly.

8. The display assembly of the claim 7 wherein said communication devices are concealed by said cover.

9. A display assembly for an appliance comprising:
a one-piece display grid including an upper surface and a lower surface spaced from the upper surface, said display grid defining at least two separate light passages within said display grid and extending completely through said display grid from said lower surface to said upper surface, wherein each passage defines a channel, each of said passages having a sidewall extending continuously between a first end at the lower surface and a second end at said upper surface; and
a plurality of light sources mounted on a circuit board, one or more of said light sources associated with one of said light passages, each of said light sources positioned proximate said first end of said light passage with at least a portion of each of said light sources extending into one of said passages; and
an interchangeable display screen engaging said second ends of said at least two light passages, said interchangeable display screen mounted in an opening in a shroud of the appliance, wherein said light sources are visible through said interchangeable display screen and said opening in said shroud.

10. The display assembly of claim 9 including a screen frame adapted to engage said display grid, said interchangeable display screen attached to said screen frame.

11. The display assembly of claim 9 wherein said display grid provides structural support for said interchangeable display screen.

12. The display assembly of claim 10 wherein each light passage is uniquely sized or shaped.

13. The display assembly of claim 9 further comprising an infrared sensor coupled to said circuit board for communicating with an external device.

14. An appliance comprising:
a display assembly having at least two light sources on a circuit board, each light source indicating a status of the appliance;
an interchangeable display screen having at least one display marking; and
a one-piece display grid extending between said light sources and said interchangeable display screen;
one or more light passages in said display grid, each light passage associated with a corresponding one or more of said light sources and configured to selectively transmit light from each of said light sources;
a display marking aligned with at least one of said light passages; and
a cover over said display assembly, wherein said cover is a shroud that houses at least a portion of the appliance, wherein said light sources are visible through said shroud.

15. The appliance of claim 14 wherein each light source independently indicates said status of the appliance.

16. The appliance of claim 14 further comprising an infrared sensor coupled to said circuit board for communicating with an external device.

17. The appliance of claim 14 wherein said plurality of light passages are each uniquely sized or shaped.

* * * * *